Sept. 27, 1966  R. A. DUNN  3,274,840
MOTOR SUPPORT

Filed June 12, 1964  3 Sheets-Sheet 1

INVENTOR.
ROBERT A. DUNN
BY
Russell L. Root
ATTORNEY.

United States Patent Office 3,274,840
Patented Sept. 27, 1966

3,274,840
MOTOR SUPPORT
Robert A. Dunn, Willowick, Ohio, assignor to Addressograph-Multigraph Corporation, Cleveland, Ohio, a corporation of Delaware
Filed June 12, 1964, Ser. No. 374,781
6 Claims. (Cl. 74—217)

This invention relates to a drive mechanism for machines, and more particularly to drive mechanisms capable of being adapted to afford various speeds for driving trains in said driving mechanism.

The present invention is directed to drive mechanisms employing endless belt or chain drive trains which require tensioning of the belts to a proper tension, and in which it is possible to change the relative speeds of the belt driven trains by changing pulley or sprocket sizes. More particularly, when a plurality of belt driven trains are driven by a common motor, the change of a pulley in one of the driven chains usually necessitates a compensation in the tension of one or more of the belts in the drive mechanism.

To assure proper operation of the machine, and to afford proper operation of the drive belt trains, a common resort, heretofore, has been to employ separate belt tensioning devices for each belt and to adjust the belt tensions thereby. Separate belt tensioning devices require considerable time to adjust and consume considerable space, which is not always available. Moreover, they are subject to being improperly adjusted due to human error. Accordingly, an object of the present invention is to provide a new and improved driving mechanism wherein the belt tensions of plural drive trains are adjusted automatically by the positioning of a driving motor which is permitted to float relative to the driving trains to a position for tensioning the belt-driven trains.

More specifically, under a further object of the invention, the motor for the drive mechanism is supported by one or more of the driving belts during adjustment of the belts to achieve the desired tensions. The motor is locked in place after the belts have been tensioned by the weight of the motor. As a further object, the present invention eliminates the need for separate slides or supports permitting the motor to be moved both vertically motor which is permitted to float relative to the driving trains to afford the proper belt tension to the respective drive trains. Further, the invention eliminates the need for individual belt tensioning devices by affording a floating motor support which can be loosened to permit the motor to move to a self-sought position on the belts, and which motor support can be secured in this self-sought position to maintain the proper tension on the respective belts.

The present invention employs in its preferred embodiment tooth belts and sprockets for the belts. In spite of their positive drive characteristics these sometimes require positive belt tensioning because spring load belt tensioning devices can permit the jumping of teeth of the belt under heavy start-up torques. Accordingly, another object of the invention is a positive manner of affording and maintaining belt tension by locking in position the driving motor for the tooth belts.

The present invention is also effective to maintain the proper belt tension after changes in size of either pulleys or belts in secondary drive trains, i.e. drive trains other than those whose belts are directly associated with the motor shaft. Accordingly, another object of the invention is the connecting of the motor-connected drive trains to the first-mentioned drive trains so that the positioning of the motor is effective through the drive trains directly connected to the motor to tension the belts in said first-mentioned drive trains.

Other and further objects of the present invention will be apparent from the following description and claims and are illustrated in the accompanying drawings which, by way of illustration show preferred embodiments of the present invention and the principles thereof and what is now considered to be the best mode contemplated for applying these principles. Other embodiments of the invention embodying the same or equivalent principles may be used as desired by those skilled in the art without departing from the present invention.

Figure 1:
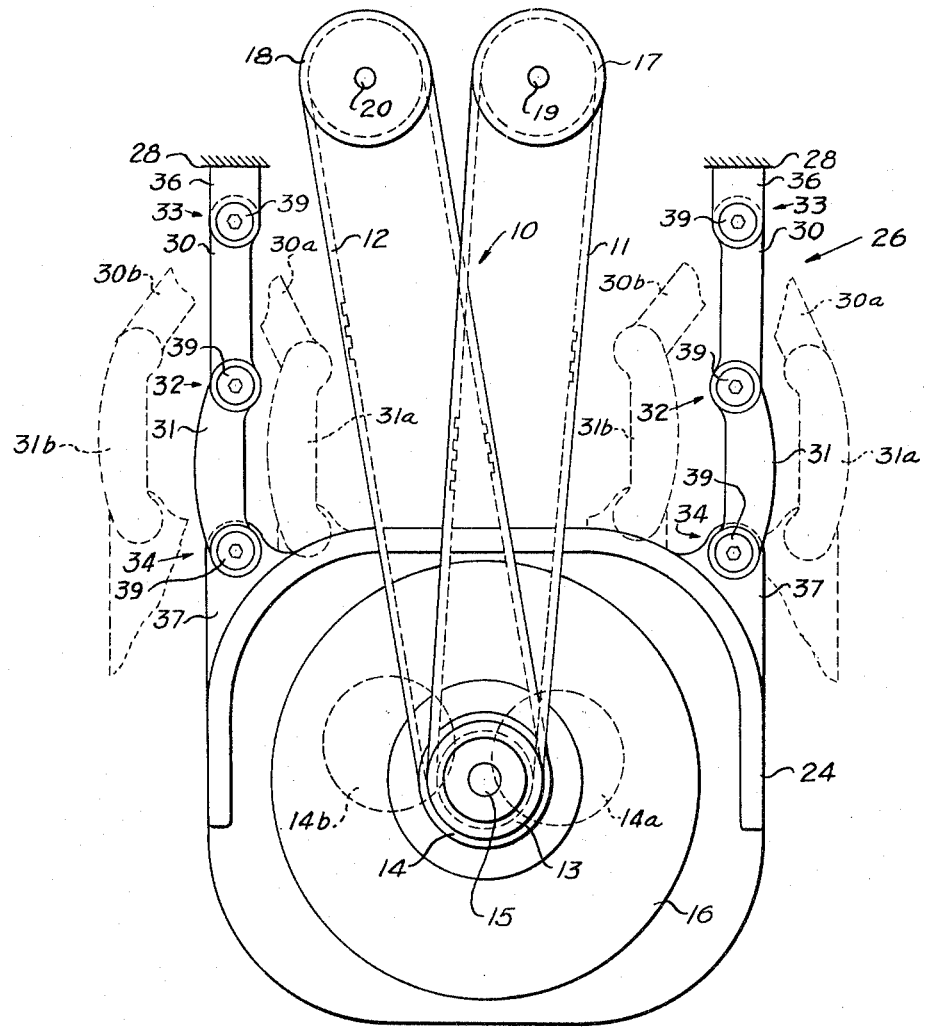
FIG. 1 is a front view of a drive mechanism including a motor and belts driven by said motor, in accordance with the preferred embodiment of the invention.
Figure 2:
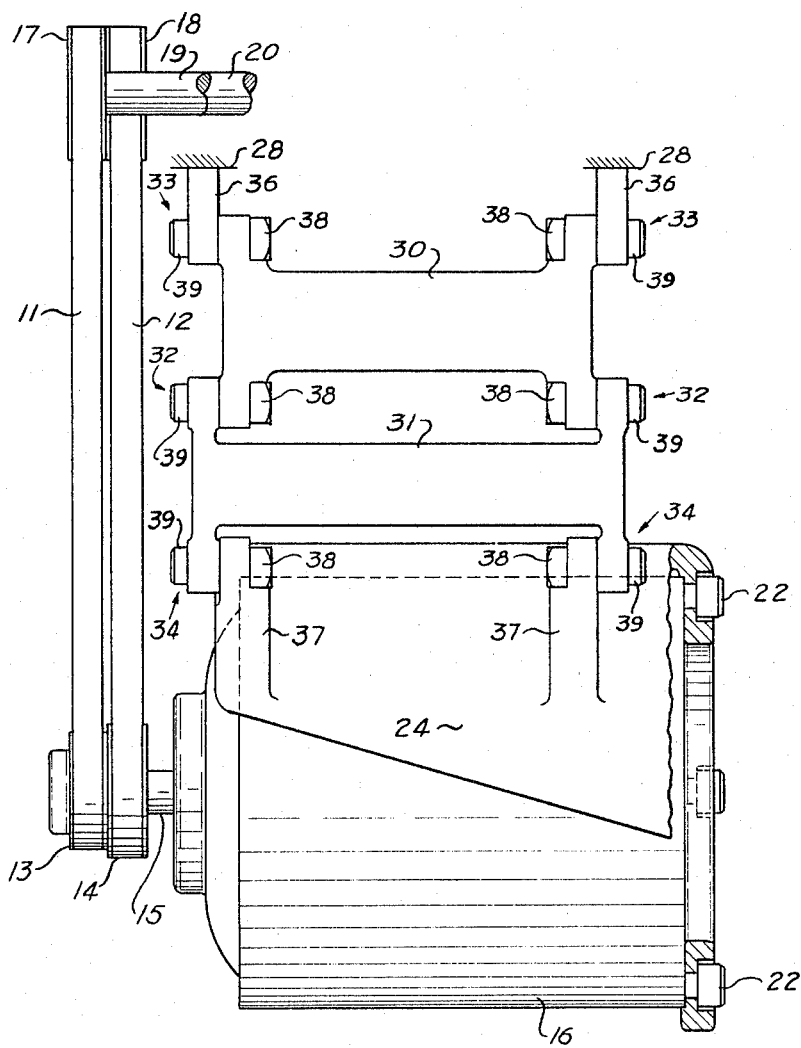
FIG. 2 is a side elevational view, partly broken away, of the drive mechanism of FIG. 1.

Referring now to the drawing, and more particularly to FIG. 1, there is illustrated a drive mechanism 10 including a pair of belts 11 and 12 which are entrained about a pair of drive pulleys 13 and 14, respectively. The pulleys 13 and 14 are coaxially mounted on the drive shaft 15 of a motor 16 (FIG. 2). Turning of the drive shaft 15 by the motor 16 drives the belts 11 and 12 to rotate driven pulleys 17 and 18, which, in turn, drive their respective shafts 19 and 20 for mechanisms (not shown) and which are mounted for rotation in bearings (not shown) affixed to the frame of a machine. The motor 16 is mounted as by screws 22 (FIG. 2) in a carrier frame 24 suspended from a link support means 26 beneath a frame member 28 of the machine. The same frame member 28 or other portions of the machine frame support the driven pulleys 17 and 18.

Many machines, for example, the card reader in which the illustrated drive mechanism 10 is intended to be employed, require that the different drive trains have the capability of being adjusted to different speeds to change the timing and speeds of operations of the mechanisms controlled thereby. One of the simplest and easiest expedients of affording such changes in timing and/or speeds of operation of these various mechanisms is to change the relative sizes of the pulleys in the driving trains. As can be readily appreciated, a change in size in one or more of the pulleys requires either re-positioning of the pulleys to maintain the belt tension or the adjustment of separate and additional belt tensioning devices. It is to be undersotod that belts 11 and 12 are toothed belts adapted to entrain about sprockets or pulleys having receptacles therein to receive the teeth of the belts. However, the present invention may be employed with non-toothed belts, chains, or any other endless-band type drive members. For ease of description the toothed belts 11 and 12 are described simply as belts hereinafter.

Under the present invention, the pulleys can be readily replaced and the belt tension adjusted automatically by the action of the motor 16 positioning itself with respect to the belts 11 and 12 when the supporting means 26 is loosened to permit the motor 16 to be free floating on the belts 11 and 12. That is, after a change in pulleys, the motor is permitted to be lowered and to move to a position it seeks to proportion its weight to each of the belts 11 and 12.

The novel supporting means 26 for the motor 16 can be loosened to permit the motor 16 to move vertically or horizontally to any position within the limits of the length of the support means 26. The support means 26 is then locked to hold the motor 16 in the position which it attains when supported on the belts 11 and 12. The supporting means 26 includes opposed first and second link members 30 and 31, which are pivoted by pivot means 32 to each other. Link members 30 are pivotally mounted by pivot means 33 to lugs 36 on the machine frame 28, and link members 31 are pivotally mounted by pivot means 34 to lugs 37 on the motor carrier frame 24, respectively. As best seen in FIG. 2, the link members 30 and 31 are relatively long H-shaped members which extend generally lengthwise of the motor 16. The link support means 26 is free to pivot about an axis through axially aligned pivot means 32, an axis through axially aligned pivot means 33, and an axis through axially aligned pivot means 34.

The pivot means 32, 33 and 34 are so constructed as to perform the additional function of clamping or securing their respectively pivoted link members in position and to hold the motor 16 in a given position. To this end the pivot means 32, 33 and 34 are in the form of clamping screws or bolts. Each assembly includes a nut 38 disposed interiorly of the respective link bars 30 and 31, and non-rotatably interlocked with adjacent surfaces, and threadedly engaged therewith a socket-head cap screw 39 with its head disposed exteriorly to be tightened to clamp the link members 30 and 31 against each other and against the lugs 36 and 37. It should be noted that the pivot means 32, 33 and 34 may be of other construction such as a bolt or a screw threaded into an opposed part to tighten or loosen the links relative to the frame means 22 or to the motor means 16. Also, it is within the purview of the present invention to make the illustrated, axially aligned but separate pivot means 32, 33 or 34 in the form of a single long one-piece pivot means rather than the illustrated short, two-piece bolts or screws. In any case the pivot means 32, 33, 34 are designed with a snug fit in the openings provided therefor so as to prevent the possibility of misalignment through slack.

When it is desired to change one or more of the pulleys, the pivot means 32, 33 and 34 are loosened and the motor 16 is lifted so that either one or both of the belts 11 and 12 can be removed. The appropriate pulley or pulleys are then removed and replaced with different pulleys to afford the desired change in speed and timing of the mechanism of the machine driven thereby. After replacing the pulley or pulleys, belts 11 and 12 are disposed about the respective drive pulleys 13 and 14 and driven pulleys 17 and 18, and the motor 16 is lowered, under its own weight, moving to a position so as to be supported by both belts 11 and 12. In this manner, the belts 11 and 12 are substantially equally tightened under the weight of the motor. The weight of the motor, in the present case, is such that the belts are automatically tightened on all of the pulleys. The motor 16 and its drive shaft 15 will be, in most instances, displaced both vertically and horizontally from the previous position. The screws 39 are then tightened to clamp the link members 30 and 31 in the position in which the motor is resting to prevent movement of the motor 16 therefrom under torque load operations. It is recognized that the weight of the links 30 and 31 may also bear to a limited extent on the belts 11 and 12 as well as the motor 16. However, it is the motor 16 which essentially affords the weight to tension the belts 11 and 12.

For the purposes of illustration, the link members 30 and 31 are shown in FIG. 1 in typical dotted line positions which they might assume due to changing to larger sizes of pulleys in either of the belt driven trains 11 and 12. Thus, a typical position which might accompany changing of one or both of the pulleys 13, 17 would be the right-most dotted line position of the link members 30 and 31 indicated as 30A and 31A. This corresponds with the dotted line position of the larger motor pulley indicated at 14A. Increasing the size of the pulleys 13 and 17 for the same belt 11 would expand the belt loop to make it considerably wider and at the same time shorter in length.

In a similar manner the floating support 26 also will permit the motor to swing leftwardly when one or both of the pulleys 14 and 18 is increased in size. In some cases it may be desired to change pulleys associated with both of the belts 11 and 12 simultaneously, and such a position, wherein both belt loops have both been shortened as by increasing a pulley diameter, is indicated by the dotted line position of the links 30B, 31B which correspond to the dotted line motor pulley position 14B.

In any event, after the change of the pulleys, and after the placement of the belts 11 and 12 about the pulleys, the weight of the motor 16 causes the motor to move both downwardly and horizontally until the motor is suspended in a position where the belts 11 and 12 balance the weight of the motor. The weight of the motor is so chosen as to afford approximately the proper tension values to each of the belts 11 and 12. Alternatively, attachable weight may be added to or counterbalancing subtracted from the weight of the motor, if the motor 16 is not of the proper weight. The screws 39 are then tightened to lock the links 30 and 31 in position to prevent movement of the motor 16 relative to the frame means 28 during operation of the machine.

The belts 11 or 12 may, in some instances, also be changed when the pulleys are changed so as to take up some of the increased or decreased length due to the changing of the width of the belt loop accompanying the change in pulley sizes. Even where the belts are charged, however, it is usually necessary to readjust the belt tension because the belts are only nominally sized and because of the tolerances present.

The relationship of the links 30 and 31 is such that the motor 16 is freely movable in a plane perpendicular to its axis. In other words, it may be said to have two degrees of translatory freedom. It is at the same time, of course, prevented from executing translation in the third direction parallel to its axis or from rocking or rotating about any axis other than one perpendicular to its plane of movement or parallel to the motor shaft. For convenience, motion of this sort may be defined as a two-coordinate movement of translation, and the same will be so referred to hereinafter. As a result of this motion the motor shaft 15 is maintained parallel to the driven shafts 19 for the pulleys 17 and 18 in all positions of the motor. This parallel relationship is due to the length of the link members 30 and 31 and the suspending of the motor 16 at widely spaced points at the front and rear of the motor 16 so that there will be no cocking even under a one-end load of the type shown.

Figure 3:
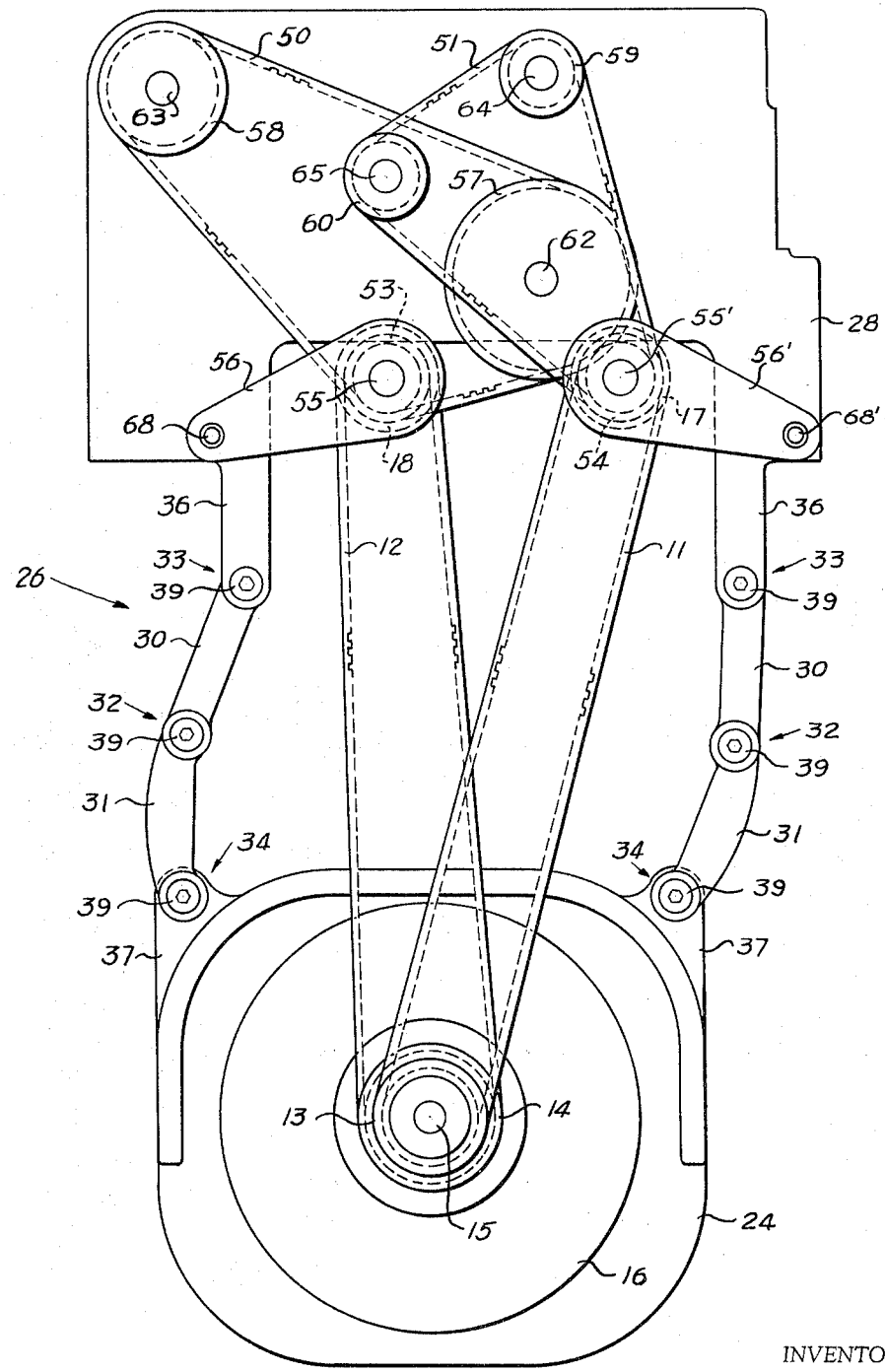
FIG. 3 is another embodiment of the invention wherein the motor is adapted to tension the belts directly associated with the motor shaft and also to tension belts in other drive trains.

Referring now to FIG. 3, there is illustrated another embodiment of the invention wherein the drive mechanism includes two additional belt driven trains having belts 50 and 51. The belts 50 and 51 are driven by pulleys 53 and 54, respectively, each of which is secured to a shaft 55 or 55' having one of the driven pulleys 18 and 17 fixed thereto. The shafts 55 and 55' have a floating relationship with the assembly by reason of being mounted at the free ends of frames 56 and 56' which are rockably supported on frame 28 by pivots 68, 68' respectively. The pulleys 17 and 18 are driven by the respective drive belts 11 and 12, as in the embodiment of FIG. 1. The belt 50 is entrained about and drives pulleys 57 and 58. Likewise, belt 51 is entrained about and drives pulleys 59 and 60. Hence, it is apparent that as the motor 16 turns the pulleys 13 and 14, and the belts 11 and 12 drive the driven pulleys 17 and 18 in the manner hereinbefore described. Because the pulleys 17 and 18 are each secured to an individual shaft 55 or 55' carrying a respective one of the pulleys 54 and 53, turning of the pulleys 17 and 18 rotates the pulleys 54 and 53, and thereby drives the belts 51 and 50 to turn the pulleys 59, 60 and 57, 58. Thus, pulleys 57, 58, 59 and 60 rotate their respective shafts 62, 63, 64 and 65 in timed relationship to perform the machine operations in timed sequence. In the card reader, the motor 16 is the prime mover for the pulley 57 and its shaft 62 operates a card separator mechanism. The pulley 58 and its shaft 63 operate means to feed the card laterally away from the operating station and into a ready station aligned with the track. The belt 51 drives pulley 60 and its shaft 65 drives the feed rolls for moving a card lengthwise of the track past a reading station. The pulley 59 and its shaft 65 drive a roller for starting the motion of the card along the track.

To accommodate a change in machine operation or a change in the size of the cards being operated and read, one or more of the ten pulleys shown in FIG. 3 can be changed along with, if necessary, appropriate ones of the four belts 11, 12, 50 or 51. The weight of the motor 16 acting through the belts 11 and 12 and through the pulleys 17, 54 and 18, 53 applies tension to the belts 51 and 50 due to the floating mounting for shafts 55. Thus all four of the belts 11, 12, 50 and 51 are appropriately tensioned. The motor is then locked in position by tightening the pivot means 32, 33 and 34 to lock the links 30 and 31 in the positions the link members 30 and 31 assumed under the weight of the motor 16.

From the foregoing, it will be seen that the present invention utilizes the weight of the motor to simultaneously set the proper tension for two driving belts for the driving mechanism, and features a floating support means, which permits the motor to move to a position to tension the driving belts of the driving mechanism and which can be locked to hold the motor in its belt tensioning position.

The present invention also can be employed with a drive mechanism having additional driving belts which likewise can be tensioned by the positioning of the driving motor prior to securing the driving motor in position. Thus, the present invention eliminates the necessity for separate belt tensioning devices for each of the respective belts, reduces the amount of time necessary for a change in speed of the machine, and eliminates the chance for human error which characterizes screw-type prior art adjustments.

While the foregoing description has been directed primarily to a form of the invention in which the motor shaft is horizontal and the weight of the motor assists in the belt tensioning operation, it will be readily appreciated that the motor and its supporting links can assume other positions, such as one in which the motor shaft is vertical, and that the tension of the belts can be set by providing manual or other pressure laterally against the motor while the support is being clamped in position. It is also apparent that while it is structurally convenient to use means related to the linkage pivoting means to provide the clamping action for fixing the motor position, it is also possible to provide a linkage whose pivots are free, and then to provide independent means for resisting motion of the motor once it is in its desired place.

While preferred embodiments of the invention have been described and illustrated, it is to be understood that these are capable of variation and modification. Accordingly, the aim in the appended claims is to cover all such variations and modifications as may fall within the true spirit of the invention.

What is claimed is:

1. In a belt driving system adapted to be readily changed to afford changes in operating speeds and adapted to be self-adjusting after changes in operating speeds, a driving means, a first endless belt means driven by said driving means at a first predetermined speed, a second endless belt means driven by said driving means at a second predetermined speed, a first pulley means driven by said first belt means, a second pulley means driven by said second endless belt means, and a support means connected to said driving means, said support means including a supporting frame, a first link means pivotally secured to said frame, a second link means secured to said first link means for pivotal movement with respect to said first link means, said driving means being pivotally secured to said second link means for both vertical and horizontal movement with the pivotal movement of first and second link means, and including clamping means for clamping said first and second link means against pivotal movement relative to each other and against relative movement with respect to said supporting frame and said driving means, said support means being releasable to suspend the weight of said driving means on said first and second belt means to tighten said first and second belt means, said support means movable with said driving means while said support means is released, said clamping means securing said support means in the position to which said support means is moved to maintain said first and second endless belt means tight.

2. A driving mechanism adapted for use in a machine having a frame means, said driving mechanism having a plurality of belt-driven trains; said belt-driven trains each having belts and pulleys which are replaceable to change the speed of said belt-driven train; a motor means for driving said belt-driven trains; and a pair of linkages each including a chain of links comprising at least two links pivoted end to end with one end of the chain pivoted to the frame and the other to the motor means, said linkages being a floating support means for said motor means providing for two-coordinate movement of translation to permit said motor means to be freely moved directly to a position applying proper tension simultaneously to all said belt-driven trains.

3. A driving mechanism as set forth in claim 2 in which the pivotal connections for the links are provided by means actuable to clamp the links and prevent their pivotal motion relative to each other and to the frame means and motor means.

4. A driving mechanism adapted for use in a machine having a frame means, said driving mechanism having a plurality of belt-driven trains, each of said belt-driven trains having belts and pulleys of which the pulleys are replaceable with pulleys of different sizes to change the speed of a belt-driven train; a motor means for driving said belt driven trains; a support means for said motor means having a plurality of depending links pivotally interconnected and adapted to be loosened to suspend said motor means by at least one of said belt-driven trains to thereby tighten said belt-driven trains, and combined pivot and clamping means for pivotally connecting said links and adapted to be loosened to permit said motor to move while supported by said belt driven trains, said combined pivot and clamping means adapted to be tightened to prevent pivoting of said links and movement of said motor means from the position assumed by said motor means when suspended by said belt-driven trains.

5. In a machine having a frame means; a motor means; a supporting means for supporting said motor means on said frame means, said supporting means having a first set of links pivotally connected to said frame means and having a second set of links pivotally connected to said first set of links and to said motor means; a driving shaft in said motor means; driving pulleys secured to said motor shaft for rotation thereby; driving belts entrained about said driving pulleys and adapted to be driven thereby; driven pulleys journaled in said frame means and having said driving belts entrained thereabout; supporting shafts in said frame means for said driven pulleys, said supporting shafts secured to said pulley means for rotation; a plurality of pivot means for pivotally connecting said first set of links to said frame means, for pivoting said first set of links to said second set of links and for pivoting said second set of links to said motor means; said pivot means being in the form of clamping screws adapted to be loosened to permit said links to pivot with the weight of said motor means being supported by said driving belts, said clamping screws adapted to be tightened to lock said sets of links against pivotal movement with respect to both said frame means and said motor means.

6. A support for an electric motor, comprising:

a motor frame and central drive shaft, said frame having two sets of fixed lugs laterally spaced, each set lying on a common center line, which center line is parallel to said drive shaft;

a series of links extending from each set of lugs;

one link having two mounting devices laterally spaced to a dimension placing the mounting lugs in position to mesh with said fixed lugs;

a pivot and clamp means connecting each aligned fixed lug and mounting device, for providing a connection having freedom of swing when released only on a center line parallel to said motor shaft, but fully immobilized when clamped;

said one link having two secondary lugs laterally spaced from said mounting lugs, said secondary lugs being sized, configured and spaced to simulate said motor fixed lugs;

a second link substantially duplicating said one link and having mounting devices secured to said secondary lugs by pivot and clamp means; and each said series of links from each set of fixed lugs having at least two said links each freely swingable only on center lines paralleling said motor shaft, and providing full rigidity when said pivot and clamp means is actuated to lock said connections.

References Cited by the Examiner

UNITED STATES PATENTS

| | | | |
|---|---|---|---|
| 705,487 | 7/1902 | Turbayne | 74—242.13 X |
| 1,319,066 | 10/1919 | Grob | 74—242.13 |
| 1,540,720 | 6/1925 | Buckbee | 74—242.13 |
| 2,204,943 | 6/1940 | Mercer | 74—242.13 X |
| 2,221,593 | 11/1940 | Lessmann | 74—242.12 |
| 2,307,382 | 1/1943 | Boller | 74—242.13 X |
| 2,311,993 | 2/1943 | Olsen | 74—242.13 X |
| 2,320,053 | 5/1943 | Suloff | 74—242.13 |
| 2,875,626 | 3/1959 | Niederer et al. | 74—242.13 |

DAVID J. WILLIAMOWSKY, *Primary Examiner.*

J. A. WONG, *Assistant Examiner.*

UNITED STATES PATENT OFFICE
CERTIFICATE OF CORRECTION

Patent No. 3,274,840                      September 27, 1966

Robert A. Dunn

It is hereby certified that error appears in the above numbered patent requiring correction and that the said Letters Patent should read as corrected below.

Column 1, line 45, strike out "motor which is permitted to float" and insert instead -- and horizontally to adjust its position --.

Signed and sealed this 22nd day of August 1967.

(SEAL)
Attest:

ERNEST W. SWIDER                      EDWARD J. BRENNER
Attesting Officer                      Commissioner of Patents